:::
United States Patent
Jocha et al.

(10) Patent No.: US 9,667,525 B2
(45) Date of Patent: May 30, 2017

(54) PROVIDING FEEDBACK TO PATH COMPUTATION ELEMENT

(75) Inventors: Dávid Jocha, Budapest (HU); András Kern, Budapest (HU); András Császár, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 788 days.

(21) Appl. No.: 13/517,281

(22) PCT Filed: Jan. 4, 2010

(86) PCT No.: PCT/EP2010/050006
§ 371 (c)(1),
(2), (4) Date: Jul. 9, 2012

(87) PCT Pub. No.: WO2011/079962
PCT Pub. Date: Jul. 7, 2011

(65) Prior Publication Data
US 2013/0007266 A1    Jan. 3, 2013

(51) Int. Cl.
*G06F 15/173* (2006.01)
*H04L 12/701* (2013.01)
(Continued)

(52) U.S. Cl.
CPC .............. *H04L 45/00* (2013.01); *H04L 45/10* (2013.01); *H04L 45/42* (2013.01); *H04L 45/62* (2013.01)

(58) Field of Classification Search
CPC ......... H04L 45/10; H04L 45/62; H04L 45/42; H04L 45/123; H04L 45/44
See application file for complete search history.

(56) References Cited

U.S. PATENT DOCUMENTS

| 7,522,603 B2 * | 4/2009 | Vasseur .................. H04L 12/66 370/238.1 |
| 2002/0087699 A1 * | 7/2002 | Karagiannis et al. ........ 709/227 |

(Continued)

FOREIGN PATENT DOCUMENTS

| CN | 1870570 A | 11/2006 |
| EP | 1885081 A1 | 6/2008 |

(Continued)

OTHER PUBLICATIONS

Vasseur et al. "Path Computation Element (PCE) Communication Protocol (PCEP)." Mar. 1, 2009; pp. 1-87; (online) [Retrieved on Mar. 6, 2009] Retrieved from Internet Engineering Task Force, IETF Standard, Internet Society, Geneva, Switzerland. Accession No. XP015065509.

*Primary Examiner* — Ario Etienne
*Assistant Examiner* — Kidest Mendaye
(74) *Attorney, Agent, or Firm* — Coats and Bennett, PLLC (57) ABSTRACT

A Path Computation Client (24) of a node in a network sends a request message (52) to a Path Computation Element (28) of the network for computation of a path, and the Path Computation Element sends a response message (54) comprising information identifying a calculated path. The Path Computation Element also sends a request for feedback on a result of the attempt to set up the connection. The Path Computation Element attempts to set up a connection based on the calculated path, and reports (64) to the Path Computation Element the result of the attempt to set up the connection.

19 Claims, 4 Drawing Sheets

(51) Int. Cl.
*H04L 12/751* (2013.01)
*H04L 12/717* (2013.01)
*H04L 12/721* (2013.01)

(56) References Cited

U.S. PATENT DOCUMENTS

| | | | | |
|---|---|---|---|---|
| 2005/0249495 | A1* | 11/2005 | Beshai | H04J 14/0241 |
| | | | | 398/45 |
| 2006/0176828 | A1* | 8/2006 | Vasseur | H04L 41/0677 |
| | | | | 370/252 |
| 2008/0069010 | A1* | 3/2008 | Zhang | H04L 45/02 |
| | | | | 370/254 |
| 2008/0151896 | A1* | 6/2008 | Zhang | H04L 45/10 |
| | | | | 370/392 |
| 2009/0110395 | A1* | 4/2009 | Lee | H04Q 11/0062 |
| | | | | 398/48 |
| 2009/0245253 | A1* | 10/2009 | Chen | H04L 12/18 |
| | | | | 370/390 |
| 2010/0054267 | A1* | 3/2010 | Bernstein | H04L 45/04 |
| | | | | 370/410 |
| 2012/0210005 | A1* | 8/2012 | Chamania | H04L 41/5054 |
| | | | | 709/226 |

FOREIGN PATENT DOCUMENTS

| | | |
|---|---|---|
| EP | 2009848 A1 * 12/2008 | |
| FR | EP 2009848 A1 * 12/2008 | H04L 45/02 |

* cited by examiner

PROVIDING FEEDBACK TO PATH COMPUTATION ELEMENT

TECHNICAL FIELD

This invention relates to computation of a path through a network, and in particular to communication between a path computation client and a path computation element, in order to allow improved path computation.

BACKGROUND

The Generalized Multiprotocol Label Switching (GMPLS) provides a control plane framework to manage arbitrary connection oriented packet or circuit switched network technologies. Two major protocol functions of GMPLS are Traffic Engineering (TE) information synchronization and connection management. The first function synchronizes the TE information databases of the node in the network and is implemented with either Open Shortest Path First Traffic Engineering (OSPF-TE) or Intermediate System to Intermediate System Traffic Engineering (ISIS-TE). The second function, managing the connection, is implemented by Resource ReSerVation Protocol Traffic Engineering (RSVP-TE).

The Resource ReSerVation Protocol (RSVP) is described in IETF RFC 2205, and its extension to support Traffic Engineering driven provisioning of tunnels (RSVP-TE) is described in IETF RFC 3209.

Relying on the TE information, the GMPLS supports hop-by-hop, ingress and centralized path computation schemes. In hop-by-hop path calculation, each node determines only the next hop, according to its best knowledge. In the case of the ingress path calculation scheme, the ingress node, that is the node that requests the connection, specifies the route as well.

Finally, in the centralized path computation scheme, a function of the node requesting a connection, referred to as a Path Computation Client (PCC) asks a special element, referred to as a Path Computation Element (PCE), to perform the path calculations, as described in IETF RFC 4655: "A Path Computation Element (PCE)-Based Architecture". In this scheme, the communication between the Path Computation Client and the Path Computation Element can be in accordance with the Path Computation Communication Protocol (PCEP), described in IETF RFC 5440.

When a PCC starts or requires the computation of a set of paths, the PCC first selects one or more PCEs. Once the PCC has selected a PCE, it sets up a session to the PCE. Upon receiving a connection request, the PCC sends a path computation request to the PCE (PCReq message) that contains a variety of objects that specify the set of constraints and attributes for the path to be computed. Each request is uniquely identified by a request-id number (Request-ID-number) and the PCC-PCE address pair.

Upon receiving a path computation request from a PCC, the PCE computes paths for the request. If it manages to compute paths that satisfy the given constraints, the PCE sends a response to the PCC in which it enumerates the calculated path(s). If no proper paths can be found, the PCE responds to the PCC and indicates that no paths have been found for the request. In PCEP, the PCRep message implements the PCE response.

There are several circumstances in which a PCE may want to notify a PCC of a specific event. For example, suppose that the PCE suddenly gets overloaded, potentially leading to unacceptable response times. The PCE may want to notify one or more PCCs that some of their requests (listed in the notification) will not be satisfied or may experience unacceptable delays. The PCNtf message is used in these cases. The PCEP Error message (also referred to as a PCErr message) is sent to indicate protocol error situations, when a protocol error condition is met or when the request is not compliant with the PCEP specification.

The document IETF RFC 5521, "Extensions to the Path Computation Element Communication Protocol (PCEP) for Route Exclusions" defines extensions to the PCEP for excluding particular resources from the path calculation. It allows mandatory and PCC desired exclusion of any resources, such as interfaces, nodes, and domains. For example, if the PCC knows of a resource failure, it can specify it as an Exclude Route Object (XRO), to tell the PCE to avoid it for this specific path calculation.

A working group draft suggests the extension of PCEP with synchronized path computation capability. This allows the PCC to request multiple parallel path calculation, for instance a protected path with the corresponding protecting paths. The document IETF RFC 5557, "Path Computation Element Communication Protocol (PCEP) Requirements and Protocol Extensions in Support of Global Concurrent Optimization", provides global path optimization capability with concurrent path calculation requests.

Other individual and working group documents deal with developing the path computation request description with the support of detailing technology specific as well as multi-technology constraints, without making changes to the overall PCE communication scheme.

The PCE, in order to be able to provide paths, has to have a view about the network and the free resources. In GMPLS, the participating control plane nodes synchronize their network view. That is, they advertise the TE information of their local resources and collect the advertisement of other nodes. For this purpose they use a Traffic Engineering extended version of the routing protocols, such as OSPF-TE, as described in IETF RFC 3630: "Traffic Engineering (TE) extensions to OSPF version 2", or ISIS-TE, as described in IETF RFC 3784: "Intermediate System to Intermediate System (IS-IS) Extensions for Traffic Engineering (TE)".

The PCE participates in the resource advertisement procedure and thus collects the TE information, in the same way as the other nodes. The PCE may also advertise its capabilities to the PCCs using OSPF-TE, as described in IETF RFC 5088: "OSPF Protocol Extensions for Path Computation Element (PCE) Discovery", or ISIS-TE as described in IETF RFC 5089: "IS-IS Protocol Extensions for Path Computation Element (PCE) Discovery".

The IETF individual draft document "draft-lee-pce-ted-alternatives-02.txt" provides an alternative method where the PCE collects the TE information directly from the nodes.

The Resource ReSerVation Protocol (RSVP) protocol described above defined a simple but effective method for any intermediate node to report flow related failures, namely the ERROR_SPEC object. This object encodes the node that reports the problem, as well as the nature of the error, with a help of a major error code and a detailing error value. As the RSVP-TE is being developed, new error codes and new values are being specified. The error code and error value pair is therefore suitable to specify the cause of the connection failure.

At the same time, the ERROR_SPEC object is not able to accurately describe which resource caused the failure, as it defines the reporting node only. The IETF RFC 3473 defines a new type of the ERROR_SPEC object that not only encodes the reporting node, but also provides a container to carry Type-Length-Values (TLVs) to identify the problematic data plane interface. The document IETF RFC 4920, "Crankback Signaling Extensions for MPLS and GMPLS RSVP-TE" enables the use of further TLVs for describing further details of the problem. With this extension, the RSVP-TE could provide more accurate information on the location and the context of the failure to the ingress node that requested the connection.

If an LSP setup fails, the initiating node is informed through RSVP-TE error signaling mechanisms, and the initiating node can request from the PCE a new path to the same destination. This new PCReq message can contain additional information to exclude the specific error causing resource, such as the node, the interface, the Autonomous System (AS) number, the Shared Risk Link Group (SRLG) ID, the label, or the switching type, listing them as subobjects of the XRO. This could give some hints to the PCE about the location of the error, but it is not always possible to accurately pinpoint the location or the exact cause. An XRO can be added to a path request in many situations, and so the presence of an XRO does not necessarily mean that an error occurred during path setup, and so using the XRO as an error indicator is not adequate.

Furthermore, this error information providing mechanism requires a subsequent path computation request. When the connection requesting node cancels the signaling as a result of the failed setup, the PCE will not be explicitly informed on the failure or success of the connection setup.

Although the PCE may infer the success of the connection setup when it receives updates to the available network resources, this implicit method does not ensure reliable one-to-one mapping between the calculated paths and the noticed changes to the resources. Besides, the absence of resource changes does not necessarily mean that the connection setup has failed.

The shortcomings of the prior art mean that the PCE can obtain only limited or inappropriate information on the feasibility of the calculated paths. Thus, it can apply only limited policy sets impacting the performance of the network. For instance, it might infer a failure and decide to avoid a particular resource when setting up a future connection, even though the failure was a transient one. Alternatively, the PCE might have insufficient information to infer the failure of a resource, and would then take the failed resource into account when setting up a future connection. In either case, this might cause long connection setup times and increased signaling overhead caused by unsuccessful and thus superfluous signaling messages.

SUMMARY

The object of the present invention is to allow the PCE to obtain useful information from the PCC, which the PCE will be able to use when setting up future connections.

According to a first aspect of the present invention, there is provided a method for use in a Path Computation Client of a node in a network. The method comprises: sending a request message to a Path Computation Element of the network for computation of a path; receiving a response message from the Path Computation Element comprising information identifying a calculated path; and attempting to set up a connection based on the calculated path. The method further comprises: receiving from the Path Computation Element a request for feedback on a result of the attempt to set up the connection; and reporting to the Path Computation Element the result of the attempt to set up the connection.

This enables the PCE to refine its view about the network and to provide better answers to future path calculation requests.

The method may comprise reporting the result of the attempt to set up the connection in a Path Computation Element Protocol message, for example by means of a Path Computation Element Protocol object, or by means of a Type-Length-Value of a Path Computation Element Protocol object.

Reporting to the Path Computation Element the result of the attempt to set up the connection may comprise: reporting whether or not the attempt was successful; and if the attempt was a failure, providing additional information about the failure. For example, the report may provide additional information about a cause of the failure and/or a location of the failure.

In some embodiments, the request for feedback on the result of the attempt to set up the connection is included in the response message from the Path Computation Element comprising information identifying the calculated path. In that case, the response message from the Path Computation Element comprising information identifying the calculated path may includes an object identifying the request message; and the method may further comprise including the object identifying the request message when reporting to the Path Computation Element the result of the attempt to set up the connection.

The method may comprise reporting to the Path Computation Element the result of the attempt to set up the connection as part of a subsequent request message to the Path Computation Element for computation of a path.

The method may further comprise advertising that the Path Computation Client is able to provide such reports to the Path Computation Element.

According to a second aspect of the invention, there is provided a method, for use in a Path Computation Element of a network, comprising: receiving from a Path Computation Client of a node in the network a request for computation of a path; calculating a path based on the request; and sending a response message to the Path Computation Client containing information identifying the calculated path. The method further comprises: sending to the Path Computation Client a request for feedback on a result of the attempt to set up the connection; and receiving from the Path Computation Client a report on the result of the attempt to set up the connection.

The report on the result of the attempt to set up the connection may then be used in future path calculations.

The report on the result of the attempt to set up the connection may be received in a Path Computation Element Protocol message, for example by means of a Path Computation Element Protocol object, or by means of a Type-Length-Value of a Path Computation Element Protocol object.

The step of receiving the report from the Path Computation Client may comprise: receiving a report as to whether or not the attempt was successful; and if the attempt was a failure, providing additional information about the failure. For example, the report may provide additional information about a cause of the failure and/or a location of the failure.

The Path Computation Element may include the request for feedback on the result of the attempt to set up the connection in the response message to the Path Computation Client. In that case, an object identifying the request may be included in the response message to the Path Computation Client and the method may further comprise receiving the object identifying the request message when receiving the report on the result of the attempt to set up the connection.

In some embodiments, the method further comprises: receiving from the Path Computation Client the result of the attempt to set up the connection as part of a subsequent request message from the Path Computation Client for computation of a path.

The method may comprise sending the request for feedback only having received notification that the Path Computation Client is able to provide such reports to the Path Computation Element.

According to other aspects of the invention, there are provided a Path Computation Client and a Path Computation Element configured to perform such methods.

DETAILED DESCRIPTION

Figure 1:
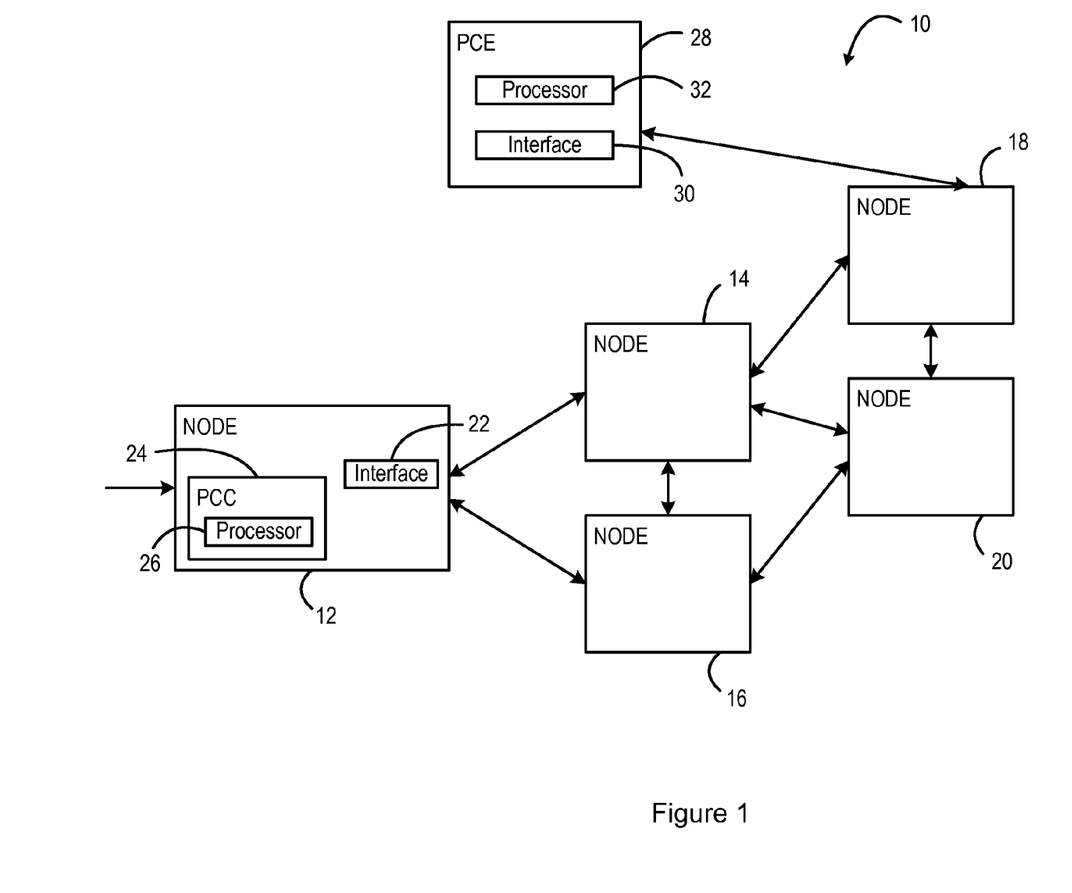
FIG. 1 is a schematic diagram, illustrating a part of a network operating in accordance with aspects of the invention.

FIG. 1 shows a Generalized Multiprotocol Label Switching (GMPLS) based network 10, having multiple nodes 12, 14, 16, 18, 20. It will be appreciated that, in practice, a network is likely to contain many mode nodes than are shown here, but this number is sufficient for an understanding of the present invention. The nodes 12, 14, 16, 18, 20 are interconnected, as shown by arrows in FIG. 1. The node 12 has an interface 22, for controlling its interactions with other nodes, and a Path Computation Client (PCC) 24, the action of which will be described in more detail below, running on a processor 26. It will be appreciated that the node 12 has various other conventional features, but this description is sufficient for an understanding of the present invention. The other nodes 14, 16, 18, 20 may be essentially similar to the node 12, but an understanding of the operation of the node 12 is sufficient for an understanding of the present invention.

The node 12 has a connection to a Path Computation Element (PCE) 28, as do other nodes of the network 10. The Path Computation Element 28 has an interface 30, for connecting with Path Computation Clients of other nodes, and a processor 32 for controlling its operation.

As will be described in more detail below, one aspect of the present invention is that, upon request by the PCE, the PCC in the connection ingress node shall inform the PCE whether setting up the connection based on the calculated path was successful or an error occurred.

In order to allow this to take place, it is preferable that each PCC should signal or advertise its ability to send such connection establishment reports. For example, this ability could be communicated to the PCE during PCC-PCE handshake, i.e. when the two entities establish the connection. The OPEN object can be extended with an optional Type-Length-Value (TLV) describing this ability of the node, or an unallocated flag of the OPEN object can be used. Alternatively, the ability of the PCC may be advertised using either Open Shortest Path First Traffic Engineering (OSPF-TE) or Intermediate System to Intermediate System Traffic Engineering (ISIS-TE) Link-State Advertisements (LSAs) to advertise node capabilities, as described in RFC 5073. An implementation could utilize one of the so far unassigned bits of the Node Capability (sub-)TLV. A third alternative is to signal the capability in the message requesting path computation, that is, in a per-request manner. Again an unused bit in the message could be used as a flag for this purpose.

Using the PCEP session establishment messages for this purpose has the advantage that the OPEN object is defined to convey various session characteristics. Signaling the capability on a per request basis is beneficial if the PCC wants to limit the number of connection establishment reports it has to send.

Either of these alternatives lets the PCE know that the PCC has the extra capability described herein, and thus the PCE may ask the PCC to report the result of the connection setup.

Figure 2:
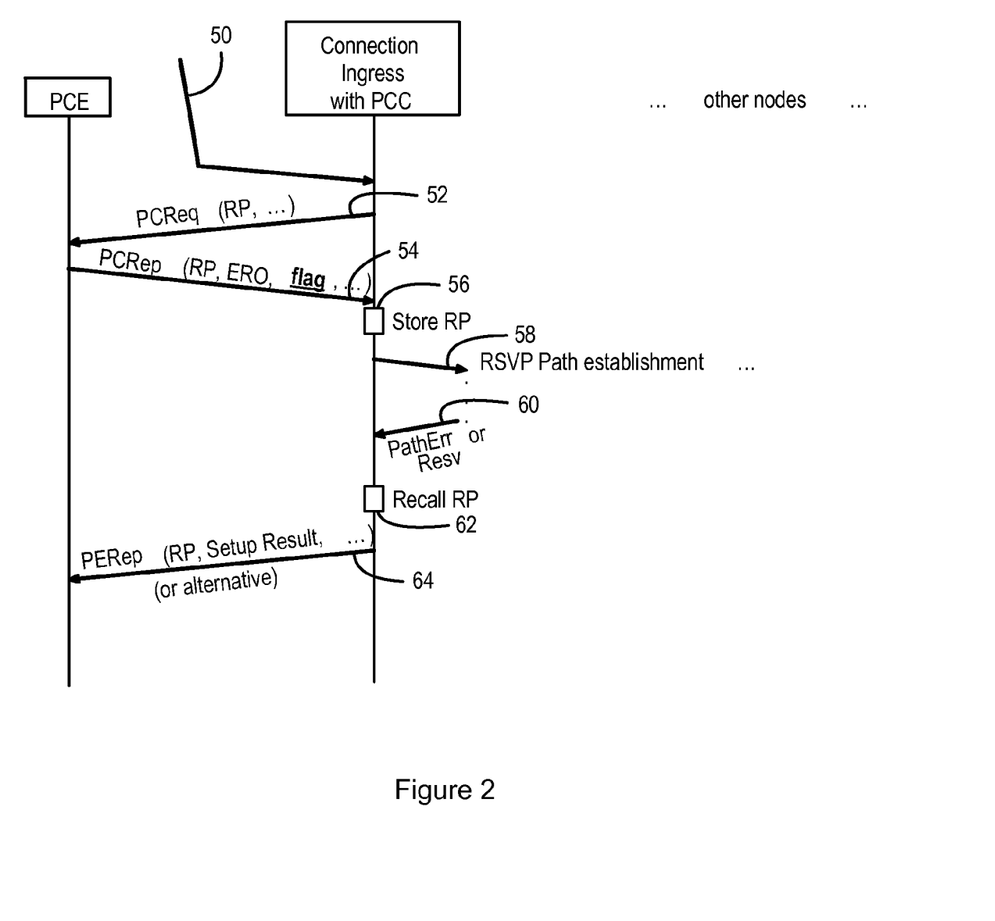
FIG. 2 is a first signalling diagram, illustrating methods in accordance with the invention.

FIG. 2 is a signal flow diagram, illustrating a message flow for a typical Label-Switched Path (LSP) setup procedure in the case where a centralized path computation scheme is used. Specifically, it is assumed here that the node 12 is the ingress node, i.e. the node at which the data 50 enters the network 10 and requests a connection, and that the node 12 wants to set up an LSP to an egress node, for example the node 18.

In order to establish the path, the PCC 24 of the node 12 first selects a PCE, in this case the PCE 28. Once the PCC 24 has selected the PCE 28, it sets up a session to the PCE 28 (if the session has not already been set up) and sends a path computation request message 52 to the PCE, in the form of a PCReq message, as defined in the Path Computation Communication Protocol (PCEP). The PCReq message may contain objects that specify the set of constraints and attributes for the path to be computed. The PCReq message contains the Request Parameters (RP) object, which contains the Request-ID-number (and some additional flags and data). Each request is uniquely identified by the Request-ID-number and the PCC-PCE address pair.

Upon receiving a path computation request from the PCC 24, the PCE 28 attempts to compute a path (i.e. a set of intermediate nodes from the ingress node 12 to the egress node 18) for the request. As defined in the Path Computation Communication Protocol (PCEP), a PCRep message implements the PCE response. If the PCE 28 manages to compute a path that satisfies the given constraints, it sends a response 54 to the PCC 24 in which it enumerates the calculated path(s) by means of an Explicit Route Object (ERO). The response message 54 also includes the RP object containing the Request-ID-number, so that the response message 54 can be correctly associated with the request message 52.

If no proper paths can be found, the PCE responds to the PCC with a PCRep message with a "no path" object. Then the Node 12 may cancel the path setup and issue an error to requesting function or may change the constraints and retry the path calculation.

As discussed above, the PCE 28 will have been informed that the PCC 24 at the ingress node 12 accepts PCRep messages where the PCE requests connection setup result reporting. Thus, a response 54 to the PCC 24 enumerating a calculated path can have a flag set, in order to indicate that a connection setup result report is requested. If requesting the connection setup result report, the PCE 28 may take other steps necessary to prepare for the reception of the report. For example, the PCE 28 may temporarily store the full original request, or may delay other calculation requests.

Thus, in this example, the PCE requests feedback on the result of the attempt to set up the connection, by setting a flag in the message that identifies the calculated path. However, it is equally possible that the PCE might send a message requesting feedback on the result of the attempt to set up the connection, separately from the message that identifies the calculated path. In that case, the message requesting feedback might be sent either before, or after, the message that identifies the calculated path.

If the flag is set in the response message 54, the PCC 24 stores (at 56) the request ID that uniquely identifies this request (obtained from the RP object), so that it will be able to reference back to it when sending the establishment report.

After receiving a positive response, in the form of a PCRep message containing a route, the ingress node 12 tries to establish the data path using Resource ReSerVation Protocol (RSVP) signaling 58. Sooner or later, the ingress node 12 will receive in message 60 either a Resv message (indicating successful path establishment and resource reservation) or a PathErr message indicating failure during the establishment. Any PathErr message specifies error objects. For example, it includes the ErrorSpec object that details the location and cause of the failure.

Having received the Resv message or the PathErr message, the PCC 24 recalls (at 62) the stored RP object that contains the PCEP Request-ID-number for the RSVP session. The PCC 24 then sends a message 64 to the PCE 28 containing the RP object that includes this Request-ID-number, and also containing a report signaling the success or failure of the establishment. In the event that attempt to establish the path was unsuccessful, the message 64 can also contain information from the ErrorSpec object, detailing the cause and location of the failure. The form of the PERep message 64 is described in more detail below.

The procedure shown in FIG. 2 expects stateful behaviour of the PCE 28, in the sense that it does not drop the details of the request immediately after responding to it. In some embodiments of the invention, PCEs may be unable to store such information, or this may be considered undesirable.

Figure 3:
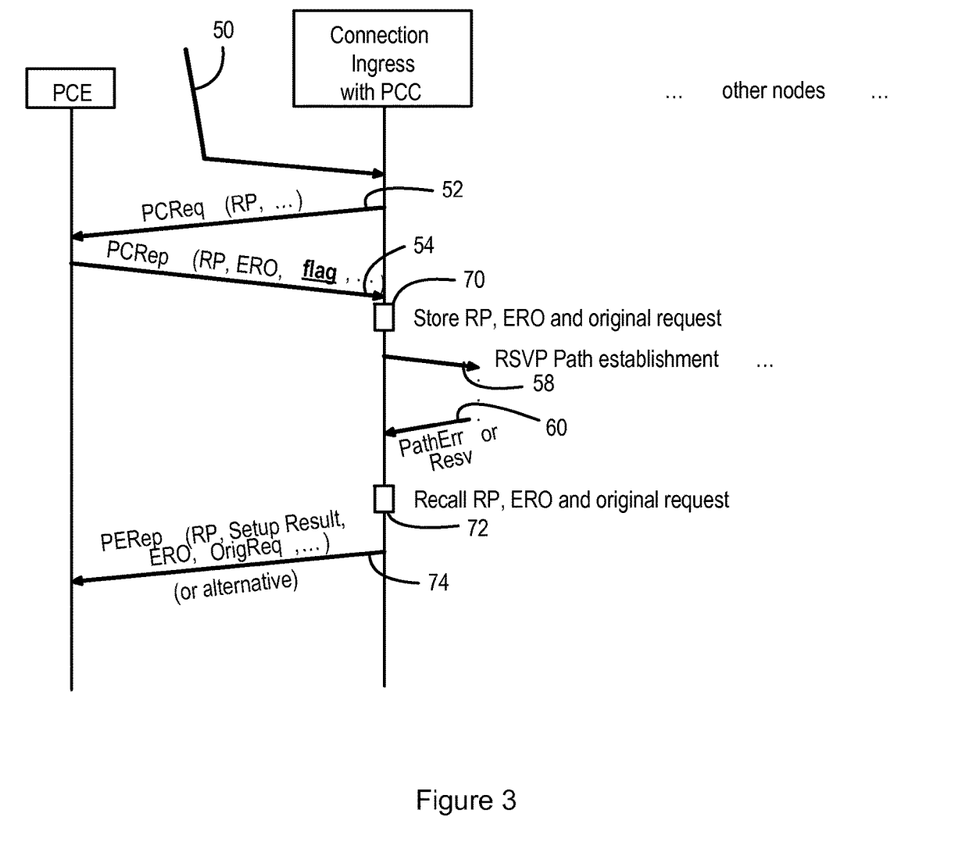
FIG. 3 is a second signalling diagram, illustrating methods in accordance with the invention.

FIG. 3 shows a procedure that can be used in the case where the behaviour of the PCE 28 is stateless. The procedure shown in FIG. 3 is somewhat similar to that shown in FIG. 2, and steps that are the same are referred to by the same reference numerals, and are not described again.

In this case, when the PCC 24 receives the response 54 enumerating the calculated path, having a flag set, indicating that a connection setup result report is requested, the PCC 24 stores (at 70) not only the request ID, but also its original request and the ERO contained in the response 54.

Then, having received the Resv message or the PathErr message at 60, the PCC 24 recalls (at 72) not only the stored PCEP request ID for the RSVP session, but also its original request and the ERO contained in the response 54, as stored at 70.

In its PERep response message 74, the PCC 24 then also sends this additional information to the PCE 28.

Hence, even in this case, reporting the result of the path computation is meaningful, as the PCE 28 may incorporate this information into its TE database. Although providing a reference back to the original request would be meaningless, this is overcome in that the PCC extends the report with the details of the original request and the reply of the PCE.

Thus, upon request by the PCE, the PCC in the connection ingress node informs the PCE whether setting up the connection based on the calculated path was successful, or whether an error occurred. In case of a failure, the PCC may provide detailed information about the location of the failure as well as information about the cause of the failure. Upon a successful connection setup, the PCC may provide several attributes collected during the signaling to the PCE. This enables the PCE to refine its view about the network and to provide better answers to future path calculation requests.

The structure of the report in one embodiment of the invention will now be described in more detail.

In this embodiment, the report is provided by means of an extension to the PCEP, updating the standard PCC-PCE communication scheme. The reporting step can be implemented as a standalone message or it may be included into a subsequent path computation request message of the same connection request.

In general terms, the setup result report structure shall contain: an indication as to whether the LSP establishment was successful or not; and, if a failure occurred: an encoding of the cause of the failure; an identifier of the node where the connection establishment failed; and an identifier of the data plane interface where the connection establishment failed. The report message may contain: detailed information of the failure causing resource; and either the route provided by the PCE (in the case of a failure) or the route recorded during the connection establishment if that was successful.

Figure 4:
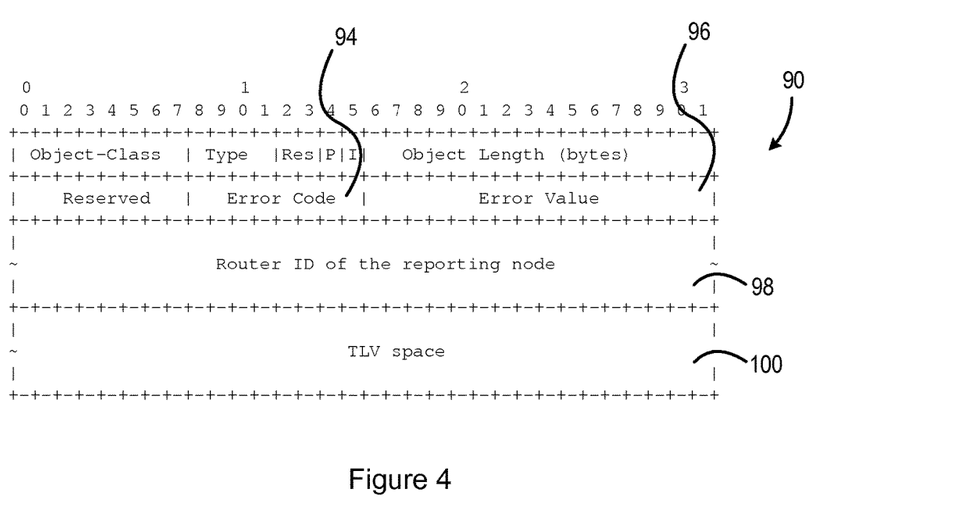
FIG. 4 illustrates a form of a first reporting object used in accordance with an aspect of the invention.
Figure 5:
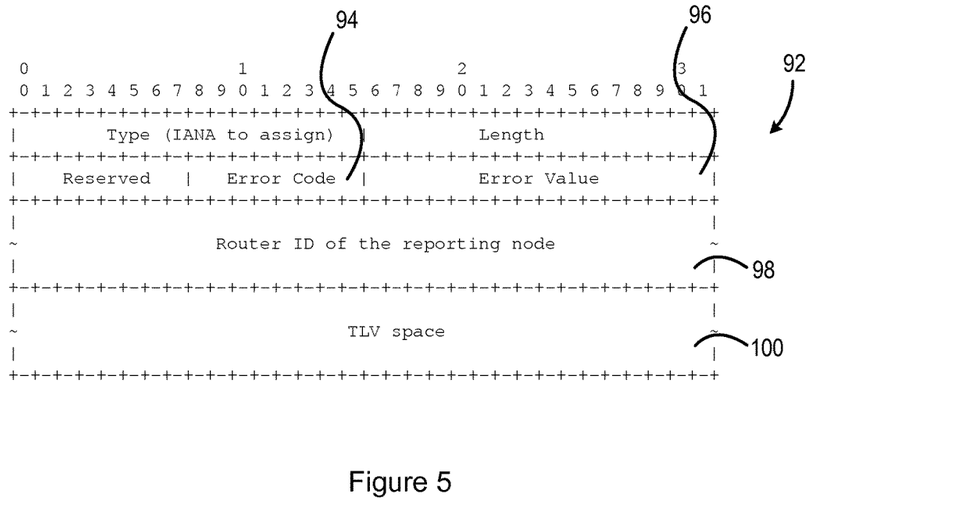
FIG. 5 illustrates a form of a second reporting object used in accordance with an aspect of the invention.

FIG. 4 shows one possible form of the report, in the case where the setup result structure is a standalone PCEP object 90, and is included into the PCEP message. FIG. 5 shows an alternative form of the report, where it is defined as a TLV 92, in order to be included into other PCEP objects.

In either case, an indication as to whether the attempt to establish the path was a success or a failure, together with the cause of the failure, is encoded with an Error Code 94 and Error Value 96 attribute pair. Setting the value of the Error Code field to 0 indicates that the connection has been successfully established, and in this case the content of the Error Value field is irrelevant. A non-zero value for the Error Code field indicates a failure, and together with the Error Value provides the cause of the error. The error code and error value pairs defined for use in RSVP-TE are applied here as well.

The node where the connection establishment failed is identified using its IPv4 or IPv6 Router ID, also contained in one of the RSVP-TE error specification (ERROR_SPEC) objects. The setup result structure carries this attribute in the "Router ID of the reporting node" field 98.

The data plane interface causing a fault is identified as a specific TLV of the RSVP-TE IF_ID ERROR_SPEC object. The RSVP-TE may provide further TLVs encoding further details on failure caused resources as a set of TLVs, as defined in IETF RFC 4920. This identified data plane interface and any such further details are obtained from the RSVP-TE IF_ID ERROR_SPEC object, and included as sub-TLVs into the reserved TLV space 100 of the setup result structure 90, 92.

As discussed above, PCEP is the protocol used for path requests and responses between the PCC and the PCE, with the message formats and encodings defined in IETF RFC 5440. The extension described herein makes it possible for the PCC to communicate to the PCE the result of an LSP setup, including details about the cause of a failure.

Transmission of the PERep message construct 64 or 74 including the SETUP_RESULT, as described with reference to FIG. 4 or 5, can be achieved, for example, by giving extensions to the PCEP, although other methods are possible.

One possibility is a general notification option, making use of the existing Notification message object. It defines a new notification type (NT=3) to indicate that the current notification encodes the result of a connection setup. Any notifications from this type always must refer to exactly one computation request: this means that setup result reporting notification must follow a single RP object. If such a NOTIFICATION object refers to zero or more than one requests (RP objects) PCErr message of invalid object must be raised. Among the control flags R bit must be 0, while all other flags are configured as is.

The Notification-Value (NV) encodes the result of the connection setup. The following values are defined:

NV=0: The connection was established without crankback (Error Code and Value of SETUP_RESULT must be set to 0).

NV=1: The connection was established but with crankback (Error Code and Value of SETUP_RESULT must be set to 0).

NV=2: The connection setup failed (Error Code and Value of SETUP_RESULT details the fault cause).

To add content to the notification, a SETUP_RESULT TLV may be embedded into the NOTIFICATION object. This TLV carries several or all attributes obtained during connection establishment.

The route calculated by the PCE may be provided as an ERO object and may be included into the PCntf message right after the NOTIFICATION object.

An alternative is an explicit message option, defining a whole new PCEP message, referred to as the PCE Path Computation Result (PCRes). The format of that message is depicted below:

```
<PCRes Message>::=<Common Header>
    <report-list>
    <report-list>::=<report> [<report-list>]
    <report>::= <RP><SETUP_RESULT>[<orig-req><ERO>]
    <orig-req> ::= <END-POINTS>
        [<LSPA>]
        [<BANDWIDTH>]
        [<metric-list>]
        [<RRO>[<BANDWIDTH>]]
        [<IRO>]
        [<LOAD-BALANCING>]
    <metric-list>::=<METRIC>[<metric-list>]
```

A single PCRes message may contain setup result reports of one or more previous computation requests. Each report consists of an RP object encoding the Path Computation Request identifier, a SETUP_RESULT object to encode the result. Optionally, it may carry the specification of the original request as well as the PCE reported path (ERO).

A further alternative is a piggy-backing option, based on extending the existing path calculation request object. This can only be used in the case of a negative LSP setup result, when a new path to the same destination is requested.

The updated PCReq message format is:

```
<PCReq Message>::= <Common Header>
    [<svec-list>]
    <request-list>
    <svec-list>::=<SVEC>[<svec-list>]
    <request-list>::=<request>[<request-list>]
    <request>::= <RP>
        <END-POINTS>
        [<LSPA>]
        [<BANDWIDTH>]
        [<metric-list>]
        [<RRO>[<BANDWIDTH>]]
        [<IRO>]
```

```
        [<LOAD-BALANCING>]
        [<SETUP_RESULT><old_req_desc>]
    <old_req_desc>::=<OLD_RP>[<orig-reg><ERO>]
    <orig-req> ::= <END-POINTS>
        [<LSPA>]
        [<BANDWIDTH>]
        [<metric-list>]
        [<RRO>[<BANDWIDTH>]]
        [<IRO>]
        [<LOAD-BALANCING>]
    <metric-list>::=<METRIC>[<metric-list>]
```

The SETUP_RESULT object encodes the result of the previous connection establishment attempt. Therefore, as it can be assumed that this previous attempt was unsuccessful, the ERROR CODE should not be set to 0. The old_req_desc structure defines details of the failed connection establishment attempt and it contains the request descriptor (OLD_RP) as well as the computed path, with further details of the original request (orig-req structure). The OLD_RP object may be implemented as a new object or as a variant of the RP object. In this latter case, the "object type" is used to differentiate between the subsequent request (carried in leading RP object of the request) and the failed request (used by previous request and carried in the OLD_RP object).

Thus, there have been described above methods by which the PCC can provide feedback to the PCE about the success of attempts to set up a path. When the PCE receives an LSP setup error indication from the PCC, the PCE may incorporate this information into its database, in order to use the information to formulate temporary policies for later path computation requests, helping to provide better path calculations in the future. Similarly, when receiving detailed path setup information, the PCE may incorporate that information into its database. This may provide additional information (such as the selected wavelength, and estimated optical impairments), the advertisement of which by Interior Gateway Protocol Traffic Engineering (IGP-TE) would not be possible, due to scalability considerations.

For example, in the case of Wavelength Switched Optical Networks (WSONs), the information model of the internal structure of the optical nodes is expected to provide very complex TE descriptors of these nodes. Therefore, due to scalability reasons, operators may decide not to advertise the full description with the link state routing protocol. Thus, the PCE might not have precise information from the routing protocol about which wavelengths can be routed through the network from one end to another end. However, the extension proposed here enables the PCE to collect wavelength availability information, even if the wavelength assignment is distributed. Specifically, the connection ingress node could report in the connection establishment result the allocated wavelength which was eventually reserved.

There is thus described a system in which a Path Computation Client can provide feedback to a Path Computation Element in a Generalized Multiprotocol Label Switching network, so that the Path Computation Element can use this information in further path computation decisions.

The invention claimed is:

1. A method for use in a Path Computation Client of a node in a network, the method comprising:
sending a request message to a Path Computation Element of the network for computation of a path;
receiving a response message from the Path Computation Element comprising information identifying a calculated path;

attempting to set up a connection based on the calculated path;

receiving, from the Path Computation Element, a request for feedback on a result of the attempt to set up the connection;

reporting the result of the attempt to the Path Computation Element.

2. The method of claim 1 wherein the reporting the result of the attempt comprises reporting the result of the attempt in a Path Computation Element Protocol message.

3. The method of claim 1 wherein the reporting the result of the attempt comprises:

reporting whether or not the attempt was successful; and if the attempt was a failure, providing additional information about the failure.

4. The method of claim 1 wherein the receiving the request for feedback comprises receiving the request in the response message from the Path Computation Element having information identifying the calculated path.

5. The method of claim 4:

wherein the response message from the Path Computation Element having information identifying the calculated path includes an object identifying the request message;

further comprising including the object identifying the request message when reporting the result of the attempt to set up the connection to the Path Computation Element.

6. The method of claim 1 wherein the reporting the result to the Path Computation Element comprises reporting the result to the Path Computation Element as part of a subsequent request message to the Path Computation Element for computation of a path.

7. A Path Computation Client of a node in a network, the Path Computation Client comprising:

a hardware processor operatively connected to an interface and a memory, the memory containing instructions executable by the hardware processor to control the operation of the Path Computation Client, and whereby the Path Computation Client is configured to:

send a request message to a Path Computation Element of the network for computation of a path via the interface;

receive a response message from the Path Computation Element comprising information identifying a calculated path;

attempt to set up a connection based on the calculated path;

receive, from the Path Computation Element, a request for feedback on a result of the attempt to set up the connection;

report the result of the attempt to the Path Computation Element.

8. A method for use in a Path Computation Element of a network, the method comprising:

receiving, from a Path Computation Client of a node in the network, a request for computation of a path;

calculating a path based on the request;

sending a response message to the Path Computation Client containing information identifying the calculated path;

sending, to the Path Computation Client, a request for feedback on a result of the attempt to set up the connection;

and receiving a report on the result of the attempt from the Path Computation Client.

9. The method of claim 8 further comprising using the report on the result of the attempt in future path calculations.

10. The method of claim 8 wherein the receiving the report on the result of the attempt comprises receiving the report on the result of the attempt in a Path Computation Element Protocol message.

11. The method of claim 8 wherein the receiving the report of the attempt comprises:

receiving a report as to whether or not the attempt was successful; and if the attempt was a failure, receiving additional information about the failure.

12. The method of claim 8 wherein the sending the request for feedback comprises including the request for feedback in the response message to the Path Computation Client.

13. The method of claim 12 further comprising:

including an object identifying the request in the response message to the Path Computation Client;

receiving the object identifying the request message when receiving the report on the result of the attempt.

14. The method of claim 8 wherein the receiving the report on the result of the attempt comprises receiving report on the result of the attempt as part of a subsequent request message from the Path Computation Client for computation of a path.

15. A Path Computation Element for a network, wherein the Path Computation Element comprises:

a hardware processor operatively connected to an interface and a memory, the memory containing instructions executable by the hardware processor to control the operation of the Path Computation Element, and whereby the Path Computation Element is configured to:

receive, from a Path Computation Client of a node in the network, a request for computation of a path;

calculate a path based on the request;

send a response message to the Path Computation Client containing information identifying the calculated path;

send, to the Path Computation Client, a request for feedback on a result of the attempt to set up the connection;

receive a report on the result of the attempt from the Path Computation Client.

16. The method of claim 1:

wherein the network is a Wavelength Switched Optical Network;

wherein reporting the result of the attempt comprises reporting an allocated wavelength that has been reserved.

17. The Path Computation Client of claim 7:

wherein the network is a Wavelength Switched Optical Network;

wherein the Path Computation Client is configured to report the result of the attempt by reporting an allocated wavelength that has been reserved.

18. The method of claim 8:

wherein the network is a Wavelength Switched Optical Network;

wherein receiving the report on the result of the attempt comprises receiving an allocated wavelength that has been reserved.

19. The Path Computation Element of claim 15:

wherein the network is a Wavelength Switched Optical Network;

wherein the Path Computation Element is configured to receive a report on the result of the attempt by receiving an allocated wavelength that has been reserved.

* * * * *